April 19, 1938.    R. P. BOWKER    2,114,587
DEVICE FOR THE DELIVERY OF MEASURED QUANTITIES OF LIQUID
Filed March 29, 1937
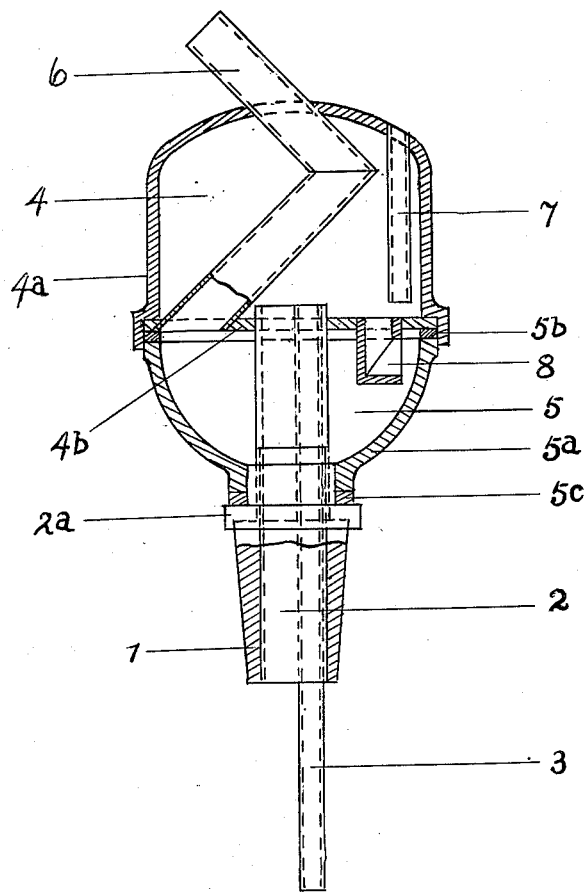
INVENTOR
Reginald Percy Bowker Patented Apr. 19, 1938

2,114,587

UNITED STATES PATENT OFFICE 2,114,587

DEVICE FOR THE DELIVERY OF MEASURED QUANTITIES OF LIQUID

Reginald Percy Bowker, Sheffield, England

Application March 29, 1937, Serial No. 133,636
In Great Britain March 31, 1936

1 Claim. (Cl. 221—147)

The invention relates to devices for the delivery of measured quantities of liquid and to those of the type adapted to be attached to a bottle or other container and comprising a measuring chamber arranged to be filled from a supply chamber attached to the measuring chamber and in direct communication with the bottle or other container to which the device is applied.

The object of my invention is so to construct and arrange the pouring pipe from the measuring chamber and the connecting pipe or passage between the two chambers that a device constructed according to my invention will deliver the same quantity of liquid at each operation as long as sufficient remains in the bottle to fill the measuring chamber, and, furthermore, the interconnecting passage between the two chambers is so formed and its outlet located in such a position relative to the measuring chamber that, during the emptying of such chamber, the measured liquid cannot flow back into the supply chamber.

I will now describe my invention with reference to the accompanying drawing which is an elevation, partly in section, of an improved device suitable for use with a bottle.

The cork 1 makes a liquid tight and air tight closure for the bottle and the pipe 2 with the air vent pipe 3 within it communicate from the inside of the bottle to the supply chamber 4 which is formed of the domed cylindrical part 4a with the circular base 4b soldered into position.

The measuring chamber 5 is formed by the glass dome 5a securely held upon the washer 5b between it and the base 4b by the threaded nut 2a upon the pipe 2 whose upper end is soldered into the base 4b. The rubber washer 5c ensures air tight and liquid tight assembly.

The nut 2a is shown recessed to receive the cork 1.

The elbow pipe 6 is soldered into the base 4b and into the domed part 4a. This is open to the measuring chamber and is the pouring pipe for measured liquid.

The air vent pipe 7 is soldered into the part 4a and this opens into the chamber 4. The short elbow pipe 8 soldered into the base 4b has its lower orifice close to the inside of the glass dome 5a. This forms the passage by which liquid in the supply chamber enters the measuring chamber and it forms an air vent when emptying the chamber 5. In plan all pipes are preferably on a common diametral line.

The operation of the device is as described below.

The device having been applied to a bottle containing liquid, the bottle is tilted over towards the left hand at the top to cause liquid to flow into the chamber 4 by the pipe 2 until the flow is arrested by the sealing of the air vent pipe 3 by the liquid in the said chamber.

The bottle is then restored to the normal vertical position, when liquid flows from the chamber 4 into the chamber 5 by way of the short elbow pipe 8.

The contents of the measuring chamber 5 are delivered by tilting the bottle again to the left at the top, when these flow out through the elbow pipe 6—the short elbow pipe 8 then serving as an air vent. As the tilting takes place the liquid remaining in the chamber 4 uncovers the top of the short elbow pipe 8 and thus no more liquid can pass into the measuring chamber—and, similarly, the liquid in the chamber 5 drops below the level of the lower orifice of the short elbow pipe 8 and no measured liquid can then return into the supply chamber.

The elbow pipe 6 is set at such an angle to the base 4b that, in order to deliver the full quantity of measured liquid, the bottle requires to be tilted to such an extent that its last remaining contents will flow into the chamber 4.

At each delivery of measured liquid the chamber 4 is automatically supplied with liquid in readiness to fill the chamber 5 as soon as the bottle is set vertical again.

A cork closure is shown and described but any other suitable one may be used instead.

In lieu of separate parts soldered together I may employ castings in which passages are formed—for example, the short elbow pipe 8 may be supplanted by making an equivalent passage in the base 4b when suitably modified. This could be done quite well by die-casting the part 4b with a suitable passage through it.

What I claim then is:—

In a device of the class described, a receptacle adapted to be connected to a container, said receptacle having primary and secondary compartments in communication; a filler conduit arranged coaxially with said receptacle and adapted to connect said primary compartment with said container; a discharge conduit having one end connected with said secondary compartment at one side of the axis of said filler conduit and its other end emerging from said receptacle in substantial alignment with the axis of said filler conduit; and vent means permitting alternate filling and emptying of said compartments.

REGINALD PERCY BOWKER.